(12) United States Patent
Chorney et al.

(10) Patent No.: US 8,626,966 B2
(45) Date of Patent: Jan. 7, 2014

(54) EMBEDDED CLOCK RECOVERY (75) Inventors: Nicholas J. Chorney, Toronto (CA); Collis Q. Carter, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 13/428,842

(22) Filed: Mar. 23, 2012

(65) Prior Publication Data

US 2012/0236755 A1    Sep. 20, 2012

Related U.S. Application Data

(63) Continuation of application No. 12/758,234, filed on Apr. 12, 2010, now Pat. No. 8,161,204.

(60) Provisional application No. 61/169,133, filed on Apr. 14, 2009.

(51) Int. Cl.
*G06F 3/00* (2006.01)
*G06F 13/00* (2006.01)
*G06F 1/00* (2006.01)
*G06F 1/04* (2006.01)
*G06F 15/16* (2006.01)
*H04L 12/56* (2011.01)

(52) U.S. Cl.
CPC ................................. *H04L 47/10* (2013.01)
USPC .............. 710/29; 710/33; 710/36; 713/500; 713/600; 709/227; 709/238; 709/248

(58) Field of Classification Search
None
See application file for complete search history.

(56) References Cited

U.S. PATENT DOCUMENTS 7,088,398 B1    8/2006    Wolf et al.

FOREIGN PATENT DOCUMENTS

| EP | 0596652 A1 | 5/1994 |
| EP | 1473700 A2 | 11/2004 |
| EP | 1102171 A2 | 5/2011 |
| GB | 2377866 A | 1/2003 |

OTHER PUBLICATIONS

Combined international Search Report and Written Opinion, International Appln. No. PCT/IB2010/000811, International Filing Date, Apr. 12, 2010, mailed Aug. 11, 2010, 12 pages.

*Primary Examiner* — Alan Chen
(74) *Attorney, Agent, or Firm* — Sterne, Kessler, Goldstein & Fox P.L.L.C.

(57) ABSTRACT

Systems and methods and computer program products are disclosed to determine the source data rate even in cases where the sink device is not directly coupled to the source device. A method includes, forming a logical channel from a source device to a sink device where the logical channel is configured to carry the source data stream and one or more rate parameters. The rate parameters relate a data rate of the source data stream to a data rate of the logical channel. Another method includes, detecting a logical channel in a received data stream where the logical channel includes the source data stream, recovering one or more rate parameters from the received data stream, determining a data rate of the logical channel, and determining the data rate of the source data stream based on the data rate of the logical channel and the one or more rate parameters.

18 Claims, 6 Drawing Sheets

EMBEDDED CLOCK RECOVERY

CROSS-REFERENCE TO RELATED APPLICATIONS

The present application is a continuation of U.S. patent application Ser. No. 12/758,234, filed Apr. 12, 2010, which claims the benefit of U.S. Provisional Application No. 61/169,133, filed Apr. 14, 2009, U.S. patent application Ser. No. 12/758,234 and U.S. Provisional Application No. 61/169,133 are both incorporated by reference herein in their entireties.

BACKGROUND

1. Field of the Invention

The present invention relates generally to synchronizing a source device and a sink device.

2. Background Art

Clock synchronization between a transmitter and a receiver is an important aspect of data communications. Often, clock synchronization refers to the clock frequency used to transmit data over a physical link connecting a transmitter and receiver. However, in some data communications applications, the receiver is required to determine a clock frequency that is not the clock frequency of the physical link. For example, a receiver such as a television display may be required to determine the clock frequency at which a data source such as a DVD decoder outputs a stream of data. Data streams where the receiver requires the clock rate at which the original data is sourced to the transmitter are called isochronous data streams.

Known methods exist for the transmission of isochronous data streams. One conventional method requires the source device to transmit one or more parameters to the sink device that relates the source data rate to the link data rate. However, depending on the link data rate when the link data rates at the source and sink differ can lead to incompatibilities. Another conventional method utilizes a buffer at the sink device where the depth of the buffer is used by the sink to determine a clock rate. However, relying on a buffer introduces variable delays and expensive buffer requirements. Yet another conventional method requires any intermediate device to regenerate the rate parameters transmitted by the source device based on the data rates of its incoming and outgoing link rates. However, requiring intermediate devices to regenerate the rate parameters adds complexity and costs to such devices.

What are needed, therefore, are improved methods and systems to enable a sink device to recover the clock rate of a source data stream. More particularly, what are needed are improved methods for synchronizing a source device and a sink device during the transmission of an isochronous data stream.

BRIEF SUMMARY OF THE INVENTION

Apparatus and methods for synchronizing a source and sink device are disclosed, where a sink device can efficiently determine the source data rate even in cases where the sink device is not directly coupled to the source device. A method for transmitting a source data stream from a source device to a sink device includes, forming a logical channel from a source device to a sink device. The logical channel is configured to carry the source data stream, and one or more rate parameters. The rate parameters relate a data rate of the source data stream to a data rate of the logical channel.

A method for a sink device to recover a source data rate includes, detecting a logical channel in a received data stream where the logical channel includes the source data stream, recovering one or more rate parameters from the received data stream, determining a data rate of the logical channel, and determining the data rate of the source data stream based on the data rate of the logical channel and the one or more rate parameters.

A data transmission system that enables a sink device to determine the source data rate includes a source device and a sink device directly or indirectly coupled to the source device. The source device is configured to form a logical channel from the source device to the sink device, the logical channel being configured to carry (i) the source data stream, and (ii) one or more rate parameters, and transmit the logical channel over a transmission link. The rate parameters relate a data rate of the source data stream to a data rate of the logical channel. The sink device is configured to detect the logical channel in a received data stream, to recover the one or more rate parameters from the received data stream, to determine the data rate of the logical channel, and to determine the data rate of the source data stream based on the data rate of the logical channel and the one or more rate parameters.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION OF TIE INVENTION

Embodiment of the present invention can enable the efficient recovery of a source clock rate in sink devices. While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments of the present invention can be used in any computer system, computing device, entertainment system, media system, game systems, or any system where a one or more transmission links couple a source device and a sink device. The present invention is particularly useful where the system comprises isochronous data streams.

Isochronous data streams require that the receiver sink device) is able to determine the clock frequency at which the transmitted data was generated. Uncompressed audio and video data streams are examples of isochronous data streams. For example, a flat panel television display receiving an uncompressed audio and video stream from a DVD player would require the rate at which the DVD player streamed the data, in order to properly render the received data streams in the display.

Industry standards such as DisplayPort, High Definition Multimedia Interface (HDMI), Digital Visual Interface (DVI), and the like, specify interfaces for connecting a source device to one or more sink devices. DisplayPort, for example, specifies a method for enabling a sink device to recover the clock frequency applied to the source data. In DisplayPort 1.1, the source device calculates an M parameter and an N parameter that relate the source data rate and the link rate, and the calculated M and N parameters are transmitted to the sink device. The sink device retrieves the M and N parameters sent by the source device, and by determining the incoming link rate, the sink device is able to determine the source data rate used at the source device. Although, the method specified in DisplayPort 1.1 may be adequate where the source is directly coupled to the sink device, it fails when the data stream traverses multiple links before arriving at the sink device. For example, when the source data stream traverses multiple links, the link rate at the source may not be the same as the link rate at the sink. The present invention enables a sink device to determine the source data rate regardless of whether it is directly or indirectly coupled to the source device. The present invention accelerates and simplifies the recovery of the source rate by providing a pair of embedded parameters. According to an embodiment, a robustly detectable data channel is provided with a well regulated rate to transmit a reference rate from source to sink. In addition, a stable and accurate measurement of the rate of the data embedded in the data channel relative to the data channel is transmitted.

The present invention, in general, eliminates the need to parse the embedded data in the received data stream. Parsing the embedded data can lead to various impairments. For example, video data has blank intervals where there is no data transmission, so the sink must determine how to reconstruct the rate by only looking at the active intervals. It may not be possible, for example, to track video data rate changes in the vertical blanking region. Also, audio data embedded in a video stream is generally bursty (due, for example, to its transmission being periodically blocked by active video data) and arrives at the sink at a relatively low rate, making rate tracking difficult and causing relatively long lock times. This can lead to long turn-on delays and/or distorted playback as the sink tries to lock to the audio data rate. It can also potentially lead to signal distortion if the sink's rate recovery logic tracks the bursts of audio data.

Conventional approaches also include having intermediate devices update the M and N parameters according to input and output interface link rates and having the intermediate device compute some scaling factor between the incoming link rate and the outgoing link rate. However, having intermediate devices perform such functions increases the complexity and cost of such devices. Another approach includes having the stream sink device buffer audio and/or video data into a buffer such as a first-in-first-out (FIFO) buffer. The stream sink device then monitors the buffer level and uses the buffer level to increase and/or decrease the recovered clock rate. When the buffer level increases, the clock rate is increased such that the buffer drain rate increases. When the buffer level decreases, the clock rate is decreased such that the buffer level increases. This approach leads to problems, such as, audio phase misalignment between monitors, audio signal distortion due to the increase/decrease of audio clocks, slow (e.g., in seconds) signal lock times for the audio/video clock, and relatively costly buffer requirements.

Figure 1:
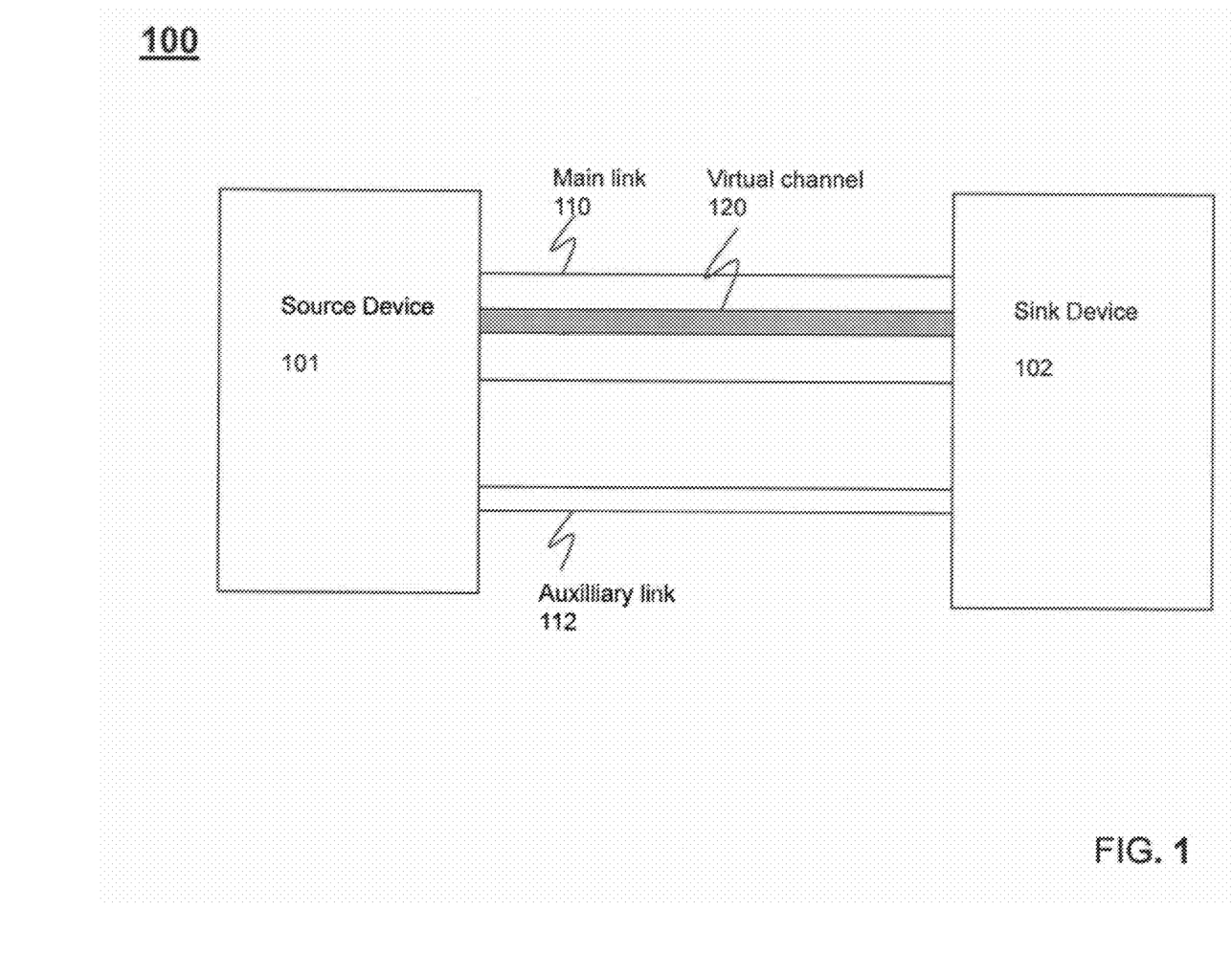
FIG. 1 shows a system including a source device and a sink device, according to an embodiment of the present invention.
Figure 3:
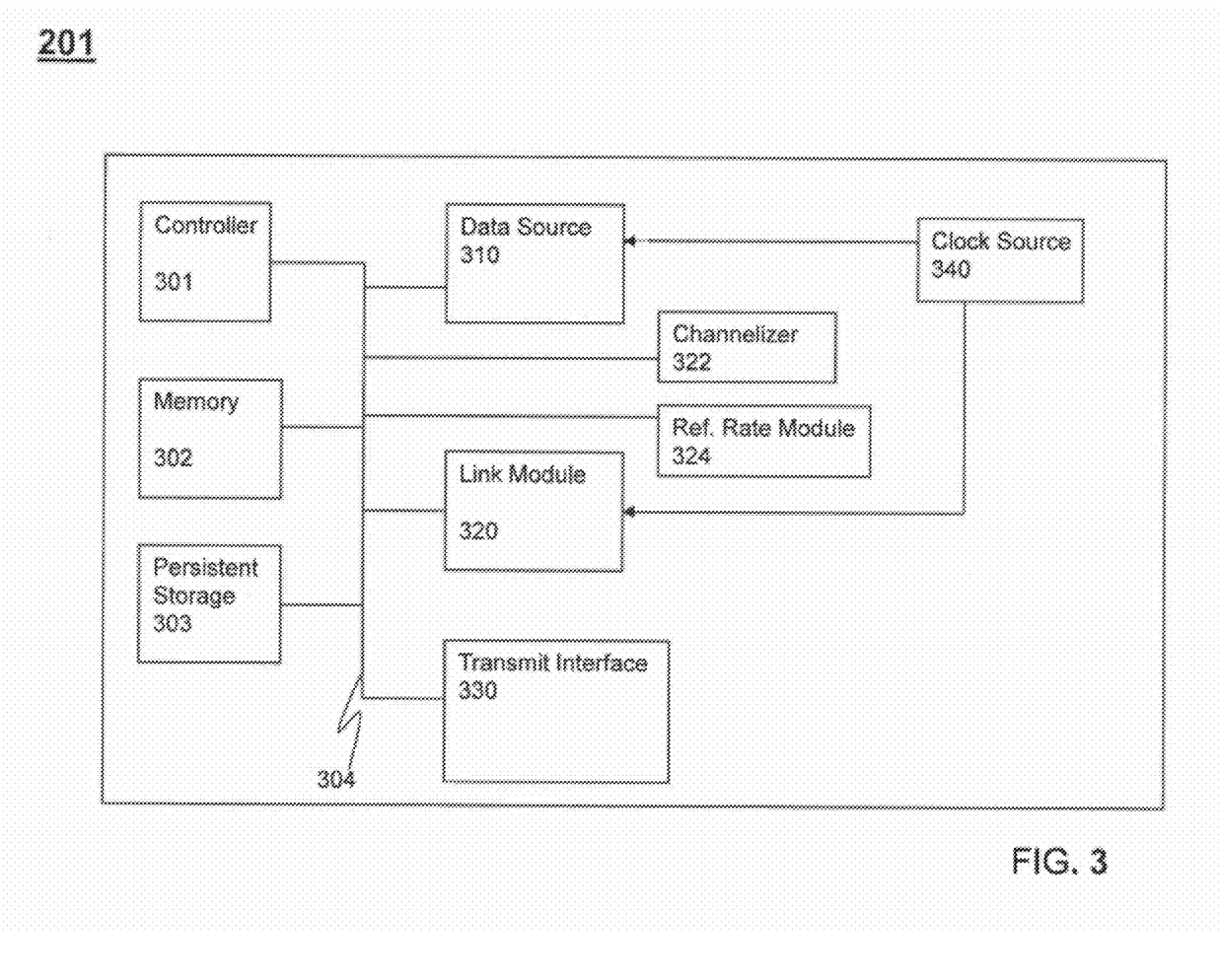
FIG. 3 is a source device, according to an embodiment of the present invention.

FIG. 1 is system according to an embodiment of the present invention. System 100 includes a source device 101, a sink device 102, a main link 110, and an auxiliary link 112. Source device 101 can be, for example, an audio and/or video streaming device such as a DVD decoder, CD player, digital camera, or MP3 player. Source device 101 can also be a computer or other computing device that generates isochronous data. Source device 101 includes the functionality to generate and/or receive a stream of source data, and to transmit the source data to a sink device either directly or via one or more intermediate devices (branch devices). Source device 101 can also include functionality to process the source data before transmission if necessary. FIG. 3 illustrates more details of a source device, according to an embodiment of the present invention.

Figure 4:
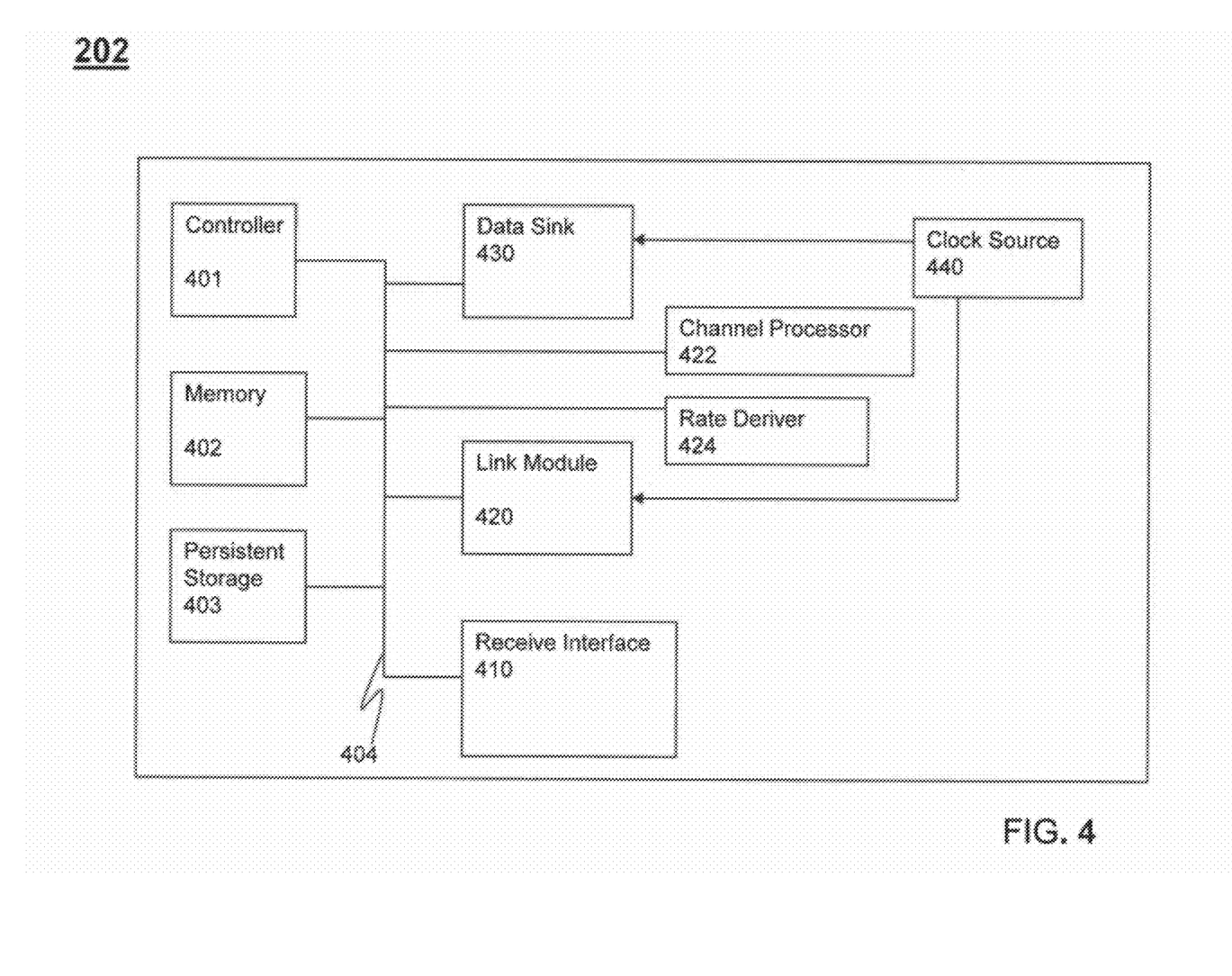
FIG. 4 is a sink device, according to an embodiment of the present invention.

Sink device 102 can be, for example, a television display, a computer display, or an audio speaker system. Sink device 102 can also be an intermediate device, such as an audio or video receiver, that can perform various processing functions on the audio and/or video streams before such streams are sent to a rendering device such as a display or speaker system. Herein, sink device 102 represents a device that requires the source data stream and associated source data rate for reasons such as rendering the source data stream and/or further processing of the source data stream. Sink device 102 includes functionality to receive a source data stream from source device 101, and to recover the clock rate of the source data (i.e., source data rate). FIG. 4 illustrates more details of a sink device, according to an embodiment of the present invention.

The main link 110 couples source device 101 and sink device 102. Main link 110 is a transmission link over which data and control information can flow between source device 101 and sink device 102. Main link 110 can include one or more physical transmission media, such as, wired or wireless connections between source device 101 and sink device 102. A transmitter in source device 101 and a receiver in sink device 102 can coordinate transmission over main link 110 such that the multiple physical links comprising main link 110 are transparent to data transmission. For example, data being transmitted may be distributed over the several physical links at the symbol level, e.g., an equal number of bits from each symbol can be transmitted over each of the available physical links.

Data is preferably transmitted over main link 110 in a packet-based format. A packet encapsulates some amount of data and has a format known to both source device 101 and sink device 102. For example, a packet can include a header portion and a data portion. The header portion includes control information such as type of data in the data portion, identity of the source device, identity of the sink device, and the like.

Some embodiments of the present invention can include an auxiliary link 112 between source device 101 and sink device 102. Auxiliary link 112 can be used, for example, for the bi-directional transfer of control information between source device 101 and sink device 102. In one embodiment, auxiliary link 112 can be used by sink device 102 to communicate its data receiving capability, such as the maximum receiving rate, to source device 101 so that source device 101 can configure its transmitter to not exceed the specified rate. In some embodiments, secondary data and control information can also be transmitted through main link 110, instead of through a separate auxiliary link 112.

The virtual channel 120 is a logical channel carrying a data stream over main link 110. Virtual channel 120 is logically overlaid on main link 110, and can utilize one or more of the separate physical links of main link 110. One or more virtual channels (sometimes also called "logical channel"), such as 120, may be initiated over main link 110. Data belonging to a virtual channel can be identified based on one or more identifiers included in the header portion of each packet carrying data in that virtual channel. For example, the header portion may include a channel-identifier that uniquely identifies a virtual channel.

In embodiments of the present invention, virtual channel 120 can be used to carry an isochronous data stream from source device 101 to sink device 102. For example, one virtual channel can be used for carrying the video data stream from a DVD player, and another virtual channel can carry the associated audio stream. Alternatively, the same virtual channel can carry both the audio and the video. Virtual channels, such as 120, allow the total bandwidth of main link 110 to be utilized for multiple simultaneously occurring data streams including isochronous data streams.

In an embodiment of the present invention, source device 101, sink device 102, main link 110, auxiliary link 112, and virtual channel 120 operate according to a known standard such as DisplayPort, or one of its variants. DisplayPort, for example, specifies that main link 110 is unidirectional from source device 101 to sink device 102, and that main link 110 can comprise of 1, 2 or 4 physical links. Auxiliary link 112, according to the DisplayPort specification, is used for the bidirectional exchange of secondary information including information such as maximum link rate and maximum channel rate that can be handled by sink device 102. In other embodiments, system 100 may have main link 110 operating according to another known standard such as High Definition Multimedia Interface (HDMI), Digital Visual Interface (DVI), Video Graphics Array (VGA) or its variants, and Low Voltage Differential Signaling (LVDS), or a similar custom data transmission standard.

Figure 2:
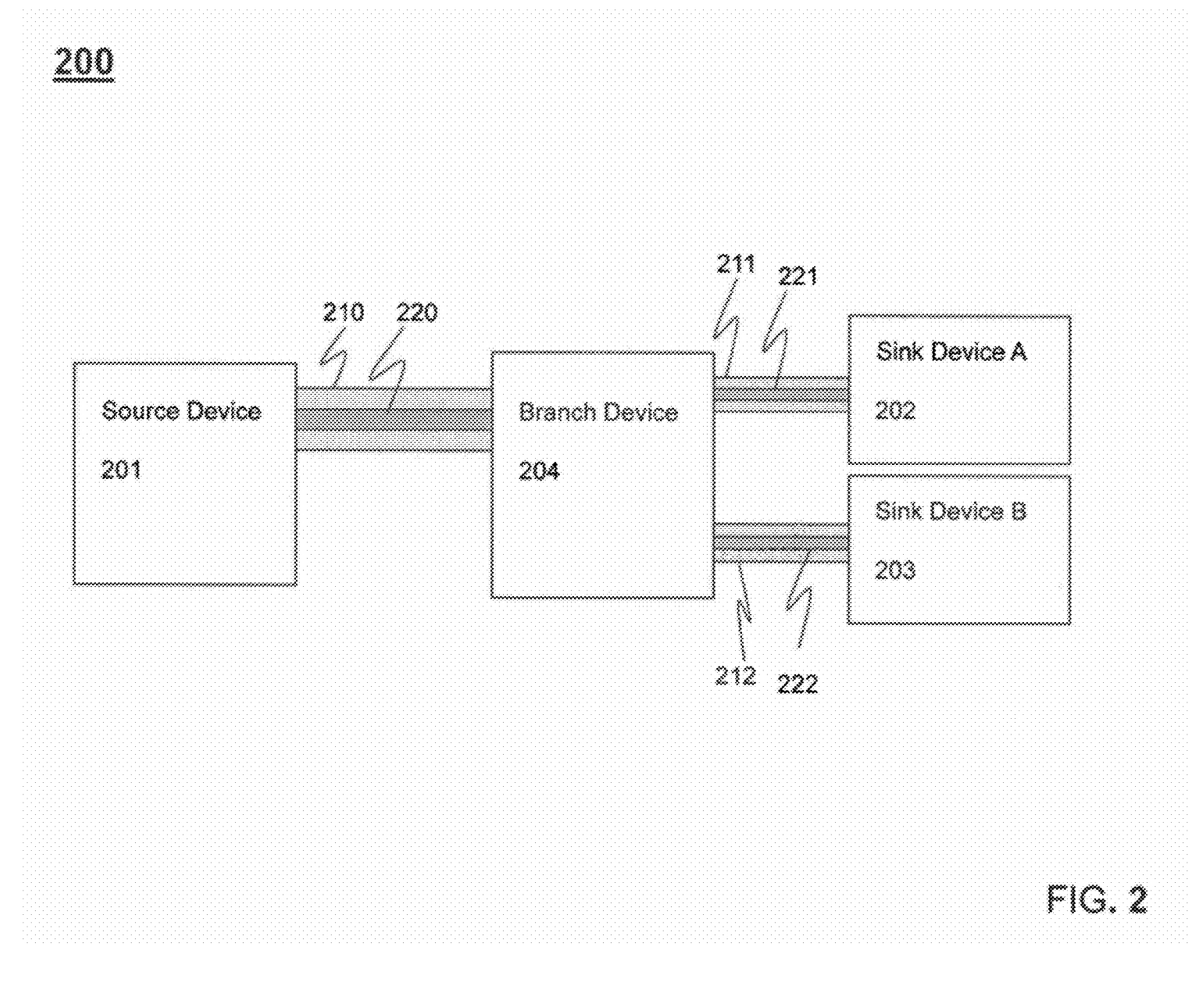
FIG. 2 shows a system including a source device, an intermediate device, and multiple sink devices, according to an embodiment of the present invention.

FIG. 2 shows another system 200, according to an embodiment of the present invention. System 200 includes a source device 201, multiple sink devices 202 and 203, and a branch device 204. Source device 201, and sink devices 202 and 203, can be as described above with respect to FIG. 1. Branch device 204 is an intermediate device that takes as input an incoming data stream, and outputs the data stream to one or more sink devices. An example of a system corresponding to system 200 is a multichannel audio speaker system where a audio receiver branch device takes an input audio stream from a source device (e.g., DVD player) and distributes the audio and video to separate sink devices (e.g., separate speakers for each audio channel, and a television display for video). Another example can be a video splitter system that allows the video output from a single source device (e.g., computer) to be distributed to multiple sink devices (e.g., display devices).

System 200 can also comply with the DisplayPort standard, or one or more of its variants. Accordingly, main links 210, 211, and 212 can be unidirectional links used for the transport of isochronous data streams. Each isochronous data stream can, for example, be transmitted within a virtual channel. For example, an isochronous data stream such as a video stream that is generated in source device 201 can be transmitted from source device 201 to branch device 204 in virtual channel 220. Branch device 204, then distributes the video stream to sink devices 202 and 203 that can be display monitors. The video stream from branch device 204 to each of the sink devices is transmitted in a virtual channel. The link rates of main links 210, 211, and 212 can differ from each other.

Corresponding to systems 100, 200, and the like, a description of the present invention requires several clock frequencies to be distinguished. A "symbol" as used herein can refer to "data symbols" or "control symbols." Data symbols are data to be transmitted that are encoded according to a protocol known to the source device and the sink device. Data symbols can include active data such as video data to be displayed as well as blanking interval data. Control symbols are a set of symbols used for framing data symbols and encoded according to a protocol known to the source device and the sink device.

The link rate refers to the rate or frequency at which symbols are transmitted on a physical link, such as main links 210, 211, and 212. Each main link 210, 211, and 212, may each have a different link rate. Related to the link rate is the link symbol clock or LS_CLK that establishes timing across the respective link.

The source data rate is the rate or frequency at which the source outputs the data stream. For example, the video source data rate from a DVD decoder is the rate at which video data is output from the decoder. The audio source data rate from a DVD decoder is the rate at which audio data is output from the decoder. Thus, the source data rate includes active data such as the actual video data as well as blanking intervals. Recovery of the source data rate of a data stream is a key aspect of the present invention.

The virtual channel data rate is the rate or frequency at which data including source data is input to an interface transmitter device. It is also the rate at which an interface receiving device inputs a received data stream to a sink device to be rendered. Expressed differently, the virtual channel data rate is the rate at which data for the virtual channel is input to a transmitter. Therefore, the virtual channel data rate is higher than the corresponding source data rate and lower than link rate.

FIG. 3 shows a source device 201 according to an embodiment of the present invention. Source device 201 includes a controller 301, a memory 302, a persistent storage 303, a communication framework 304, a data source 310, a link module 320, a transmit interface 330, a clock source 340, a channelizer 322, and a reference rate module 324. Controller 301 may be any one or more processor including a central processor unit (CPU) or graphics processor unit (GPU). Controller 301 controls the operation of devices in source device 201. For example, controller 301 can execute the logic instructions implementing one or more of, link module 320, transmit interface 330, clock source 340, channelizer 322 and reference rate module 324. The logic instructions of link module 320, transmit interface 330, clock source 340, channelizer 322 and reference rate module 324 can be implemented in software, hardware, or a combination thereof.

Memory 302 includes one or more memory devices, for example, dynamic random access memory (DRAM) devices. Memory 302 is used to store logic for portions modules including link module 320, transmit interface 330, clock source 340, channelizer 322 and reference rate module 324, as needed for execution. Memory 302 can also be used to buffer incoming stream data from data source 310 to transmit interface 330.

Persistent storage 303 can include one or more persistent storage devices such as magnetic disk, optical disk, flash memory, and the like. Persistent storage 303 can store the logic of link module 320, transmit interface 330, clock source 340, channelizer 322 and reference rate module 324, as needed. For example, in one embodiment, persistent storage 303 stores all portions of link module 320, transmit interface 330, clock source 340, channelizer 322 and reference rate module 324 that are implemented in software in executable form to be loaded into memory 302 upon startup of source device 201.

Communication bus 304 couples components of source device 201, such as two or more of 301, 302, 303, 310, 320, 322, 324, 320, 330, and 340. Communication bus 304 may include a Peripheral Component Interface (PCI) bus or one of its variants, Universal Serial Bus (USB), Firewire, Ethernet, or a like device.

Data source 310 can be any device that produces a source data stream. For example, a video or music playback device (e.g., the playback device or decoder of a DVD, CD, MP3, digital camera, and the like) can be included in data source 310. In one embodiment, data source 310 can be a DVD playback device that decodes and uncompresses video data stored on the DVD before the data is sent to transmit interface 330. For example, the DVD video data may be stored using Motion Picture Experts Group version 2 (MPEG2) video compression standard. Data source 310 would uncompress the MPEG2 video in accordance with the MPEG2 standard, and inject the uncompressed video data into link module 320 to be transmitted to sink device 202 to be rendered on a display. Although not described here, a person of skill in the art would understand that data source 310 can include components such as, but not limited to, a frame buffer, decoder, and a timing controller, that can be used in generating the source data stream to be input into link module 320.

Link module 320 includes the functionality to provide services such as packing and/or stuffing packets and/or frames according to transmission requirements. Link module 320 can also provide the functionality to multiplex secondary data (such as control information, and or other information to be displayed with the video stream) and perform encryption.

Channelizer 322 can be implemented as part of the link module 320 or as a separate module. Channelizer 322 includes the functionality to receive the source data stream from data source 310 and to initiate one or more virtual channels to transmit that source data as one or more source data streams to a sink device. For example, receiving a DVD video and audio stream from data source 310, channelizer 322 can initiate one or more virtual channels for the video and audio streams. The initiation of a channel can include creating an identifier for the channel, and passing the appropriate identifier with the corresponding stream data to the link layer. In some embodiments of the present invention, initiation of a virtual channel involves the exchange of messages with corresponding sink devices and branch devices. An exchange of messages prior to setting up a virtual channel, for example, enables the configuration of the virtual channel with a dynamically determined channel rate.

For example, the channel rate of the virtual channel can be set at a rate that each device in the path of the data flow can support. In an embodiment, the channel rate is determined to be at a value that is greater than the peak rate of the corresponding source data stream and that maps to the physical transmission characteristics of the underlying transmission media. It is also preferable that the channel rate is set at a level supportable by substantially all intermediate devices along the path of the data flow. Channelizer 322 or link module 320 can, preferably, stuff in-active data in the virtual channel data stream so that the channel rate is maintained at the set level.

Reference rate module 324 includes the functionality to determine one or more reference parameters that convey timing relationships that can be transmitted to the sink device. In one embodiment, reference rate module 324 determines a first parameter and a second parameter to be transmitted to sink device 202. The first parameter and second parameters are determined to express the relationship (source data rate)/(channel rate). In one embodiment, the second parameter can be a predetermined number of cycles of the corresponding virtual channel clock. The first parameter, then, can be the number of cycles of the source data stream clock that occur within the virtual channel clock interval defined by the second parameter. One or more phase lock loops or the like can be used to lock on to a clock, for example, from clock source 340.

Clock source 340 can include one or more clock sources that are used for generating the source data stream clock, the virtual channel clock, and the link clock. Embodiments of the present invention may use a separate clock from clock source 340 for each of the source data stream clock, the virtual channel clock, and the link clock, a single clock for all, or a combination. For example, if the same clock is used for source data stream clock and the virtual channel clock, the first and second parameters would not change in value during the transmission of the source data stream. If different clock sources are used, for example, the second parameter can stay constant while the first parameter can fluctuate because it is defined relative to the second parameter. The clock sources used in clock source 340 may include any known clock generating device such as one or more crystal or silicon oscillators.

Transmit interface 330 includes the functionality to receive the outgoing data stream from, for example, link module 320 and to send it out over a transmission link, such as link 210, to a sink device such as 202 or to a branch device such as 204. Transmit interface 330 also includes the functionality to transmit data, as appropriate, over a main link and an auxiliary link in systems where both types of links exist. In one embodiment, transmit interface 330 includes functionality specified in the physical layer, such as, the physical transmission and error correction of the transmitted data. The transmission of the data occurs according to the link clock. In an embodiment, transmit interface 330 can include a differential transmitter. For example, in one embodiment, transmit interface 330 includes functions necessary to transmit video data frames and control information over main link 210 using the low-voltage differential signaling interface standard (LVDS).

A person of skill in the art would understand that source device 201 can comprise components or modules in addition to those shown, or different combinations thereof. It should also be noted that the functionality of data source 310, link module 320, transmit interface 330, channelizer 322, reference rate module 324, and clock source 340, can be implemented in software, firmware, hardware, or a combination thereof. In one embodiment, for example, the functionality of data source 310, link module 320, transmit interface 330, channelizer 322, reference rate module 324, and clock source 340 is specified in a hardware description language such as Verilog, RTL, netlists, to enable ultimately configuring a manufacturing process through the generation of maskworks/photomasks to generate a hardware device embodying aspects of the invention described herein.

FIG. 4 shows a sink device 202, according to an embodiment of the present invention. Sink device 202 includes a controller 401, a memory 402, a persistent storage 403, a communication framework 404, a data sink 430, link module 420, receive interface 410, clock source 440, channel processor 422, and rate deriver 424. Controller 401 may be any one or more processor including a central processor unit (CPU) or graphics processor unit (GPU). Controller 401 controls the operation of devices in sink device 202. For example, controller 401 can execute the logic instructions implementing one or more of, link module 420, receive interface 410, clock source 440, channel processor 422 and rate deriver 424. The logic instructions of link module 420, receive interface 410, clock source 440, channel processor 422 and rate deriver 424 can be implemented in software, hardware, or a combination thereof.

Memory 402 includes one or more memory devices, for example, dynamic random access memory (DRAM) devices. Memory 402 is used to store logic for portions modules including link module 420, receive interface 430, clock source 440, channel processor 422 and rate deriver 424, as needed for execution. Memory 402 can also be used to buffer incoming stream data from receive interface 410 to data sink 430.

Persistent storage 403 can include one or more persistent storage devices such as magnetic disk, optical disk, flash memory, and the like. Persistent storage 403 can store the logic of link module 420, receive interface 430, clock source 440, channel processor 422 and rate deriver 424, as needed. For example, in one embodiment, persistent storage 403 stores all portions of link module 420, receive interface 430, clock source 440, channel processor 422 and rate deriver 424 that are implemented in software in executable form to be loaded into memory 402 upon startup of sink device 202.

Communication bus 404 couples components of sink device 202, such as two or more of 401, 402, 403, 410, 420, 422, 424, 420, 430, and 440. Communication bus 404 may include a Peripheral Component Interface (PCI) bus or one of its variants, USB, Firewire, Ethernet, or a like device.

The receive interface 410 includes the functionality to receive the incoming data stream from a link, such as main link 211, from a source device or a branch device. The received data can then be sent to the link module 420. Receive interface 410 also includes the functionality to receive data, as appropriate, over a main link and an auxiliary link in systems where both types of links exist. In one embodiment, receive interface 410 includes functionality specified in the physical layer, such as, the physical transmission and error correction of the transmitted data. In an embodiment, receive interface 410 can include a differential receiver. For example, in one embodiment, receive interface 410 includes functions for receiving video data frames and control information over main link 211 using the low-voltage differential signaling interface standard (LVDS).

Link module 420 includes the functionality to provide services such as unpacking and/or destuffing packets and/or frames according to how the packets were transmitted from the source device or a branch device. Link module 420 can also provide the functionality to demultiplex secondary data (such as control information, and or other information to be displayed with a video stream) and perform decryption of the incoming stream as necessary.

Data sink 430 can be any device that can receive an incoming data stream and process and/or render it. For example, data sink 430 can be a video and/or audio rendering device such as a television display, or an audio rendering device such as a speaker system. In some embodiments, data sink 430 may be an interface to which an external rendering device is connected to. In one embodiment, data sink 430 can be a display device that receives uncompressed video data and related timing information. Although not described here, a person of skill in the art would understand that data sink 430 can include components such as, but not limited to, a frame buffer, decoder, and a display timing recovery module.

Channel processor 422 can be implemented as part of the link module 420 or as a separate module. Channel processor 422 includes the functionality to receive the source data stream from link module 420 and to detect one or more virtual channels that includes source data as one or more source data streams. For example, receiving a DVD video and audio stream from link module 420, channel processor 422 can determine one or more virtual channels for the video and audio streams. The determination can be based on detecting a unique identifier defining a virtual channel. Channel processor 422 can also include functionality to receive and respond to messages from a source device in setting up a virtual channel. Channel processor 422 and/or link module 420 also includes the functionality to identify and discard such fill data (such as data included by branch devices to equalize the transmit rate of the virtual channel to a pre-specified channel rate).

Rate deriver 424 includes the functionality to detect one or more reference rate parameters transmitted from source device 201, and to determine the source data rate based on those parameters, the link rate, and the channel rate. The rate parameters define the timing relationship between the source data rate and the channel rate. The one or more rate parameters transmitted from source device 201 can be recovered from, for example, header information of packets in the incoming packet stream. The link rate and the channel rate can be locally determined. One or more phase lock loops, oscillators, and/or the like can be used to lock on to received detected clocks such as, the link clock, the virtual channel clock, and/or the source data stream clock.

Clock source 440 can include one or more clock sources and/or clock circuitry that are used for locking on to one or more of the data stream clock, the virtual channel clock, and the link clock. Embodiments of the present invention may use a separate clock from clock source 440 for each one of the source data stream clock, the virtual channel clock, and the link clock, a single clock for all, or a combination. The clock sources used in clock source 440 may include any known clock generating device such as one or more crystal or silicon oscillators, or clock locking circuitry such as phase lock loop circuits.

A person of skill in the art would understand that sink device 202 can comprise components or modules in addition to those shown, or different combinations thereof. It should also be noted that the functionality of a data sink 430, link module 420, receive interface 410, clock source 440, channel processor 422, and rate deriver 424, can be implemented in software, firmware, hardware, or a combination thereof. In one embodiment, for example, the functionality of a data sink 430, link module 420, receive interface 410, clock source 440, channel processor 422, and rate deriver 424 is specified in a hardware description language such as Verilog, RTL, netlists, to enable ultimately configuring a manufacturing process through the generation of maskworks/photomasks to generate a hardware device embodying aspects of the invention described herein.

Figure 5:
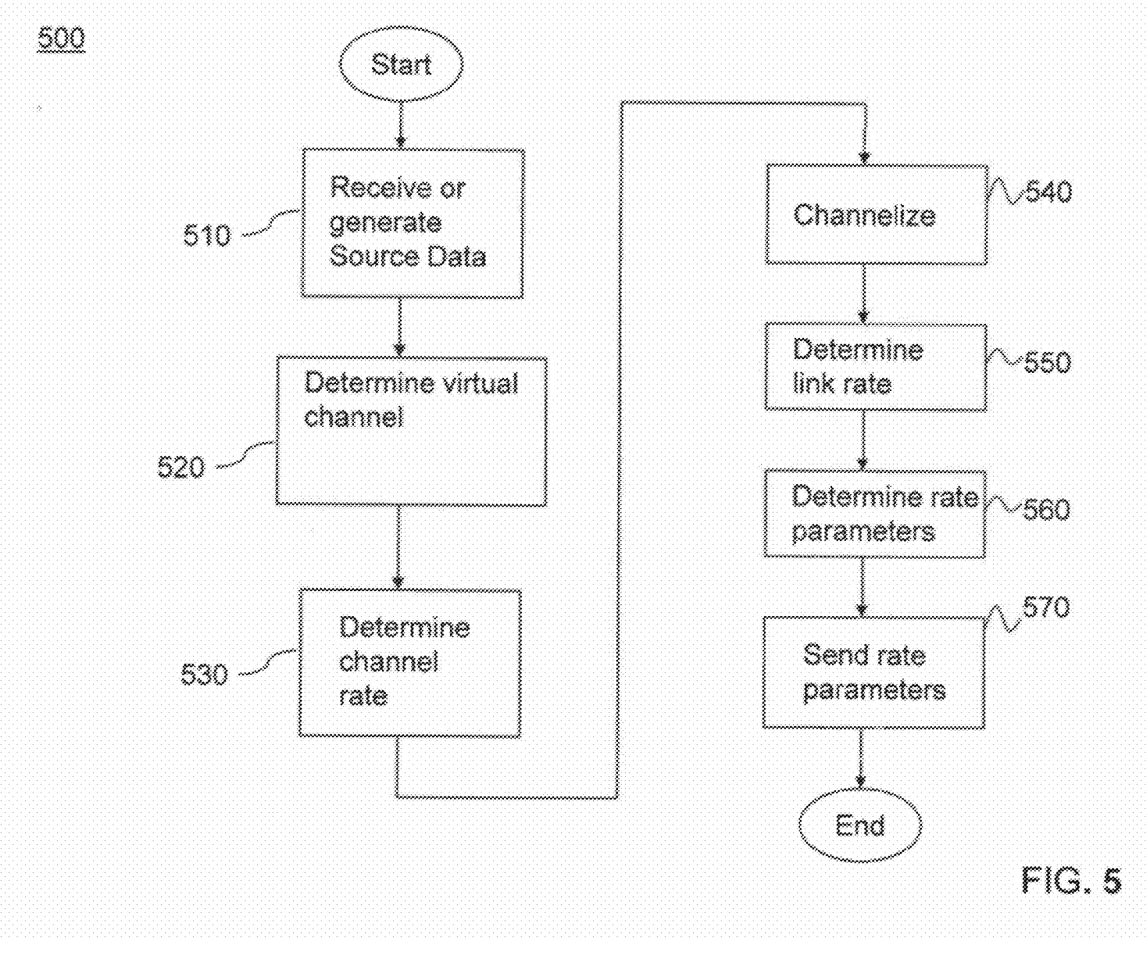
FIG. 5 is a flowchart showing steps in a process implemented in the source device according to an embodiment of the present invention.

FIG. 5 illustrates a process 500 by which a source device, such as source device 201, can transmit information needed for a sink device, such as sink device 202, to regenerate the source data rate. In step 510, the source device receives and/or generates a source data stream. For example, the source device can be a data source such as a DVD playback device generating a video and/or audio stream. The video and/or audio stream generated by the data source is referred to as the source data stream. The data source generates the source data stream at a rate determined by several factors including the encoding of the video and audio data (such as, MPEG2). A clock source or a clock locking circuit, for example, from clock source 340, can be used for generating a clock or to lock on to the clock generated from the source data stream. The clock frequency that determines the data rate of the source data stream is referred to as the source data stream clock or source data stream rate.

In step 520, the source data stream is mapped to one or more virtual channels. As described above, a virtual channel is a logical stream imposed on the physical transmission link. Typically, there is a one-to-one mapping between a virtual channel and a source data stream. However, in some cases, one source data stream can be mapped to multiple virtual channels. For ease of description, and without loss of generality, the following description of process 500 largely assumes a one-to-one mapping between the source data stream and a virtual channel. For example, a source data stream with video and multi-channel audio may be mapped to multiple virtual channels. Upon receiving the first data of the source data stream, a channelizer and/or a link module determines that a new virtual channel is required. The channelizer can generate a channel identifier that would be in the header portion of every packet carrying data from the source data stream. In some embodiments, the source device, for example, using the channelizer and/or the link, module, can notify the sink device and/or corresponding branch device of the initiation of the new virtual channel.

In step 530, a channel rate is determined for the virtual channel. The channel rate or the virtual channel clock rate is the rate at which the virtual channel is populated with the source data and other secondary data. For example, the channel rate can account for the rates at which source data and secondary data is packed into packets, headers are constructed, data is encoded into symbols, and any control symbols being added to the packets. It should be noted, however, that embodiments of the present invention can have other aspects included and/or have some of the described aspects excluded from the channel rate. Each embodiment can have a consistent method of determining the channel rate between a source device and the corresponding one or more sink devices.

In step 540, the source data stream is channelized. For example, channelizer 322 and/or link module 320 can packetize data from the source data stream. In some embodiments of the present invention, secondary data may be multiplexed into the virtual channel. Channelizing includes packing data stream data and any secondary data into packets of fixed or variable sizes, forming the header portions of each packet, encoding the data stream data and secondary data according to an encoding scheme, and adding control symbols required for the rendering of the source data stream in a rendering device. For example, a video source data stream may need to be packed with inactive data so that the virtual channel data can be transmitted at the predetermined channel data rate.

In step 550, the link rate is determined. For example, the link rate is the rate at which link module 320 transmits packets through transmit interface 330. Typically, each source device, branch device, and sink device has one or more link rates at which it can operate. The term "link rate" as used in the description of process 500, refers to the clock rate at which the outgoing link, such as main link 210, operates. It should be noted that link bandwidth refers to the aggregate of the capacity of all physical links that comprise main link 210. The link rate is typically determined by a preconfigured clock, for example, from clock source 340.

In step 560 rate parameters to be communicated to the sink device are determined. In embodiments of the present invention, a first rate parameters (M) and a second rate parameter (N) are determined. According to the present invention, parameters M and N are intended to convey the relationship between the source data stream clock and the virtual channel clock. In an embodiment, N is configured to have a value corresponding to a predetermined number of cycles of the virtual channel clock, and M is measured as the number of cycles of the source data stream clock that occurs during the interval defined by N. Other embodiments may include methods of computing an M and an N differently while still conveying the relationship between the source data rate and the channel rate. M and N parameters are determined separately for each virtual channel. M and N parameters can also be separately determined for different types of data, such as, audio and video. For example, even within a single virtual stream, video and audio may require rendering at different rates.

According to one embodiment, after the N parameter is determined, for example, through configuration, (1) may be used to determine M:

$$M = \left( \frac{F_{source\_data\_rate}}{F_{virtual\_channel\_rate}} \right) \times N \quad (1)$$

where N is the duration corresponding to a configured number of cycles of the virtual channel clock, $F_{source\_data\_rate}$ is the frequency of a source data stream, $F_{virtual\_channel\_rate}$ is the frequency of the virtual channel clock, and M is the M parameter for the source data stream. The $F_{source\_data\_rate}$ and $F_{virtual\_channel\_rate}$ can be determined as described with respect to steps 510 and 530, respectively.

In step 570, the determined M and N parameters are transmitted to the sink device. For example, if only one pair of M and N parameters were determined for the virtual channel, then that pair of values are transmitted. If multiple pairs of M and N values were determined for the virtual channel, such as separate pairs for video and audio, then substantially all those pairs may be transmitted. The M and N values to be transmitted can be encoded into the packet stream from source device to sink device. In one embodiment, the M and N values are encoded in a header field of a packet carrying data from the source data stream, according to a predetermined format. In another embodiment, M and N values may be communicated through special packets of a predetermined format.

In embodiments of the present invention, process 500 (steps 510-570) can be repeated at regular intervals, to update the M and N parameters being communicated to the sink device. In the interval between repetitions of process 500, the last computed M and N values can be transmitted at intervals during the existence of the virtual channel.

Figure 6:
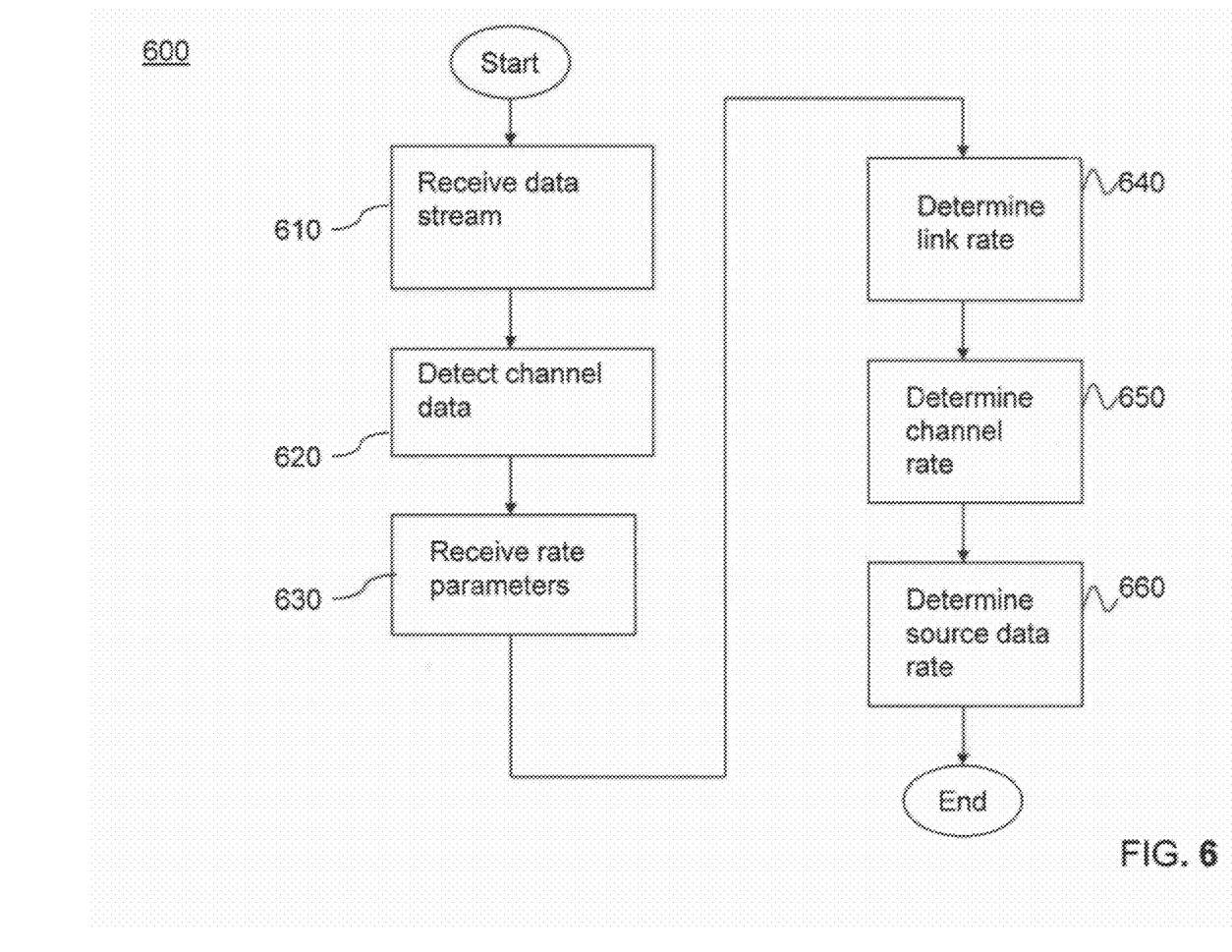
FIG. 6 is a flowchart showing steps in a process implemented in the sink device according to an embodiment of the present invention.

FIG. 6 illustrates a process 600 that derives a source data stream rate, according to an embodiment of the present invention. Process 600 is described here as being executed in a sink device, such as sink device 202. However, as noted above, process 600 can be executed in other devices including intermediate or branch devices if there is a need to recover the source data stream rate.

In step 610, data from a data stream is received. For example, receive interface 410 of sink device 202 can receive a data stream from source device 201 directly or through one or more intermediate devices 204. A receive interface can receive the data stream over an incoming link, such as main link 211, performs any physical layer functions such as error correction, and passes the recovered frames to another module, such as link module 420.

In step 620, a module, such as link module 420 and/or channel processor 422, detects a virtual channel in the incoming data stream. For example, link module 420 can process incoming frames to recover packets, and to detect and remove stuffing packets and symbols. Channel processor 422 can, for example, process packets having the same channel identifier in the header fields as from the same virtual channel.

In step 630, rate parameters transmitted from the source device are recovered. For example, the first and second rate parameters (M and N) can be encoded in the header portion of one or more incoming packets. In another embodiment, the M and N parameters can be recovered from separate packets transmitted from the source device. As described with respect to process 500, one or more pairs of M and N parameters can be used for recovering the corresponding source data stream clocks.

In step 640, the link rate is determined. The link rate of the sink device can defer from the link rate of the source device, such as in system 200 where a branch device 204 is in between source device 201 and sink device 202. The link rate of the sink device can be determined by the sink device by locking on to the received clock. For example, sink device 202 can detect its link rate (i.e., the rate at which main link 211 operates) by locking on to the received clock in the incoming data stream. In an embodiment, a clock source and/or a locking circuit such as a phase lock loop can be used to detect and synchronize to the dock based on which data is received over the link.

In step 650, the channel rate of the virtual channel is determined. For example, channel processor 422 and/or link module 420 can determine the rate at which virtual channel data is received. Prior to determining the channel rate, link module 420 and/or channel processor 422 strips away any fill data, for example, inserted by intermediate devices to maintain the transmission of the virtual channel at the predetermined channel rate. For example, source device and/or intermediate devices can insert stuffing packets and fill data to adjust the outgoing channel rate. The determination of the channel rate can be based on locking on to the clock generated by the incoming virtual channel data. In one embodiment, a link clock is used as the reference with which the channel rate is determined by locking on to the clock generated by the incoming virtual channel data.

In step 660, the source data stream clock, or the source data rate is determined. For example, rate deriver 424 can receive the M and N parameter values recovered by channel processor 422, the link clock determined by link module 420 and the virtual channel data rate determined by channel processor 422 and link module 420. The received parameters and the determined dock rates can be used to derive the source data rate, in one embodiment the source data rate can be determined using the following calculation:

$$F_{source\_data\_rate} = \left(\frac{M}{N}\right) \times F_{ls\_clk} \times \left(\frac{F_{virtual\_channel\_rate}}{F_{ls\_clk}}\right) \quad (2)$$

where N is the durations corresponding to a predetermined number of cycles of the virtual channel clock, and M is the number of cycles of the source data clock within the interval defined by N. N and M are received parameters from the source device. $F_{virtual\_channel\_rate}$ is the channel rate, which is determined at the sink device. $F_{ls\_clk}$ is the link rate, which is also determined at the sink device as described with respect to step 640 above. The $F_{source\_data\_rate}$ can be determined using (2) above. It should be noted in (2) that, any reference clock can be used in place of the link rate (link clock). Also, in some embodiments, such as embodiments in which the channel rate can be independently determined, the source data rate can be determined using only M, N, and the channel rate.

Process 600 can be repeated periodically to recompute the relevant source data stream clock rates. It should also be noted that embodiments of the present invention can implement process 600 or a similar process to determine relevant source data clock rates using one or more rate parameters received from a source device. The rate parameters received from the source device relate the virtual channel clock rate and the source data clock rate.

As described above, the present invention allows a sink device to determine the source data rate of an isochronous data stream, regardless of whether the sink device is directly or indirectly coupled to the source device. By initiating a virtual channel for a source data stream, and then communicating the sink device one or more parameters that relate the channel rate to the source data rate, a source device enables the sink device to recreate the relevant source clocks even when the source device and sink device have different link clocks.

Advantages of the present invention compared to conventional approaches include reduced cost and reduced complexity in branch devices and sink devices, short lock durations, increased signal to noise ratio, and the possibility of audio phase alignment between rendering devices. Branch devices are simplified because they are not required to recompute the M and N parameters before passing them on. Sink devices are simplified because no burden is imposed on the sink device other than to determine the virtual channel clock and to compute the required source rates. Also the signal to noise ratio of the received signal is higher because the present invention allows more accurate recovery of the source data rate. Further, phase alignment between rendering devices is made possible because the present invention eliminates variable delay components from the processing path.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for transmitting a source data stream, comprising:
transmitting a stream of packets including a source data stream and two or more rate parameters, wherein the two or more rate parameters relate a data rate of the source data stream to a data rate of the transmitted stream of packets.

2. The method of claim 1, further comprising:
determining the data rate of the stream of packets based on a data rate excluding fill data.

3. The method of claim 1, further comprising:
determining a first rate parameter corresponding to a number of cycles of a stream of packets, data rate clock relating to a data rate of the stream of packets; and
determining a second rate parameter corresponding to a number of cycles of a source data stream clock within a first interval, wherein the first interval is determined based on the first rate parameter and the stream of packets, data rate clock, and wherein the source data stream clock relates to the data rate of the source data stream,
wherein the two or more rate parameters include at least the first rate parameter and the second rate parameter.

4. The method of claim 1, wherein
the two or more rate parameters are included in one or more packets in the steam of packets.

5. The method of claim 1, further comprising:
receiving the source data stream; and
determining the data rate of the source data stream based on the received source data stream.

6. The method of claim 1, further comprising:
generating the source data stream; and
determining the data rate of the source data stream based on the generated source data stream.

7. A method, comprising:
receiving a stream of packets;
recovering a source data stream and two or more rate parameters from the received stream of packets;
determining a data rate of the received stream of packets; and
determining a data rate of the source data stream based on the data rate of the received stream of packets and the two or more rate parameters.

8. The method of claim 7, further comprising:
determining the data rate of the source data stream is further based on a link rate of an input interface on which the stream of packets is received.

9. The method of claim 7, wherein the recovering a source data stream and rate parameters comprises:
detecting a first rate parameter in the received stream of packets; and
detecting a second rate parameter in the received stream of packets,
wherein the first rate parameter and the second rate parameter relate the data rate of the source data stream to the data rate of the stream of packets.

10. The method of claim 7, wherein determining a data rate of the stream of packets comprises:
determining the data rate of the stream of packets based on a data rate excluding fill data.

11. The method of claim 7, wherein determining the data rate of the source data stream comprises:
multiplying the data rate of the stream of packets by a ratio of the second rate parameter and the first rate parameter.

12. The method of claim 7, wherein the two or more rate parameters are included in one or more packets in the stream of packets.

13. A device, configured to:
transmit a stream of packets including a source data stream and two or more rate parameters, wherein the two or more rate parameters relate a data rate of the source data stream to a data rate of the transmitted stream of packets.

14. The device of claim 13, further configured to:
determine a first rate parameter corresponding to a number of cycles of a stream of packets, data rate clock relating to a data rate of the stream of packets; and
determine a second rate parameter corresponding to a number of cycles of a source data stream clock within a first interval, wherein the first interval is determined based on the first rate parameter and the stream of packets, data rate clock, and wherein the source data stream clock relates to the data rate of the source data stream,
wherein the two or more rate parameters include at least the first rate parameter and the second rate parameter.

15. A device, configured to:
receive a stream of packets;
recover a source data stream and two or more rate parameters from the received stream of packets;
determine a data rate of the received stream of packets; and
determine a data rate of the source data stream based on the data rate of the received stream of packets and the two or more rate parameters.

16. The device of claim 15, further configured to:
determine the data rate of the source data stream based further on a link rate of an input interface over which the stream of packets is received.

17. The device of claim 15, further configured to:
detect a first rate parameter in the received stream of packets; and
detect a second rate parameter in the received stream of packets,
wherein the first rate parameter and the second rate parameter relate the data rate of the source data stream to the data rate of the stream of packets.

18. The device of claim 15, further configured to:
multiply the data rate of the stream of packets by a ratio of the second rate parameter and the first rate parameter.

* * * * *